Dec. 5, 1939.     W. H. SELLEW     2,182,453
HEAT TRANSFER PROCESS AND APPARATUS
Filed Jan. 18, 1936     9 Sheets-Sheet 1

Fig. 1.

INVENTOR
William H. Sellew
BY
ATTORNEY

Dec. 5, 1939.   W. H. SELLEW   2,182,453
HEAT TRANSFER PROCESS AND APPARATUS
Filed Jan. 18, 1936   9 Sheets-Sheet 2

INVENTOR
William H. Sellew
BY
ATTORNEY

Dec. 5, 1939.    W. H. SELLEW    2,182,453
HEAT TRANSFER PROCESS AND APPARATUS
Filed Jan. 18, 1936    9 Sheets-Sheet 6

INVENTOR
William H. Sellew
BY
ATTORNEY

INVENTOR
William H. Sellew
BY
ATTORNEY

Patented Dec. 5, 1939

2,182,453

UNITED STATES PATENT OFFICE 2,182,453

HEAT TRANSFER PROCESS AND APPARATUS

William H. Sellew, Indianapolis, Ind.

Application January 18, 1936, Serial No. 59,712

9 Claims. (Cl. 62—119)

This invention relates to heat transfer processes and the like such as are suitable for cooling, heating, refrigeration, air conditioning and energy conversion.

An object of the invention is to improve such processes.

Other objects of the invention will be apparent from the following description and accompanying drawings taken in connection with the appended claims.

The present application is a continuation in part of my co-pending applications S. N. 335,512 filed January 28, 1929, and S. N. 746,045 filed September 29, 1934.

The invention comprises the features of construction, combination of elements, arrangement of parts, and methods of manufacture and operation referred to above or which will be brought out and exemplified in the disclosure hereinafter set forth, including the illustrations in the drawings, the scope of the invention being indicated in the appended claims.

For a fuller understanding of the nature and objects of the invention as well as for specific fulfillment thereof, reference should be had to the following detailed description taken in connection with the accompanying drawings, in which.

Like reference characters denote like parts in the several figures of the drawings.

While a preferred embodiment of the invention is described herein, it is contemplated that considerable variation may be made in the method of procedure and the construction of parts without departing from the spirit of the invention. In the following description and in the claims, parts will be identified by specfic names for convenience, but they are intended to be as generic in their application to similar parts as the art will permit.

Figure 1:
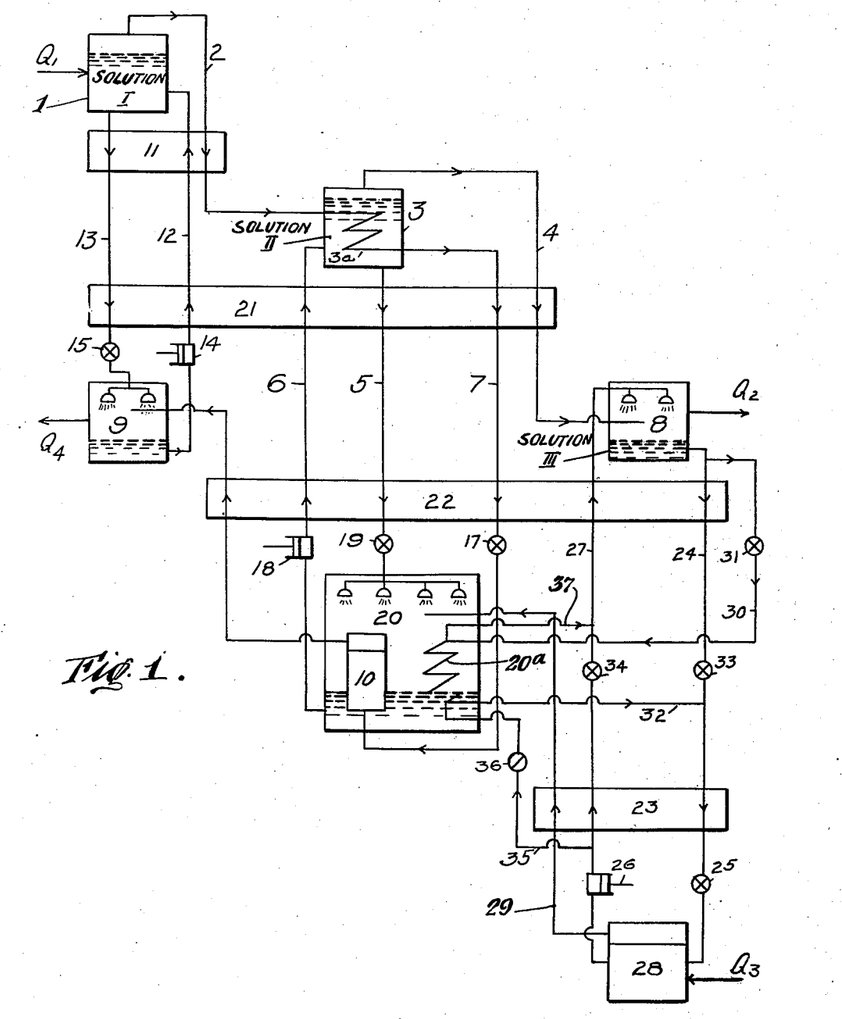
Figure 1 is a diagram illustrating a cyclical process involving certain features of my invention.

Figure 1 shows a form of my invention in which two dissimilar solutions are used, each of which has a different solvent, or three solutions may be used, two of which have a common solvent. Solvent I is vaporized from solution I in concentrator 1 by the absorption of the heat quantity $Q_1$ which may be supplied to solution I in any manner. The superheated solvent vapor I leaves concentrator 1 through line 2 and passes through the counter current heat exchanger 11 giving off its superheat to the dilute solution entering concentrator 1 through line 12. Solvent vapor I is then condensed in coil 3a giving up its latent heat of condensation to solution II which is concentrated in concentrator or stripper 3 with the evoluion of solvent vapor II which passes off through line 4 and the counter current heat exchanger 21 thereby conserving the superheat in superheated vapor II leaving concentrator 3. Condensed solvent vapor I from coil 3a passes through line 7, the counter current heat exchanger 21 and the counter current heat exchanger 22, pressure reducing means 17 and into vaporizer 10. Here the heat absorbed from absorber 20 serves to vaporize solvent I from vaporizer 10. The solvent I is dried and superheated in passing through counter current heat exchanger 22 and then enters absorber 9 where it is condensed and absorbed in solution I with the evolution of heat $Q_4$. The diluted solution I is circulated by pump 14 through line 12 through the counter current heat exchangers 21 and 11 to concentrator 1. Concentrated solution from concentrator 1 flows through line 13 through the counter current heat exchangers 11 and 21 and the pressure reducing means 15 into the spray heads in absorber 9.

Solvent vapor I thereby operates in a closed cycle in conjunction with solution I. Solvent vapor II is used to accomplish the useful purpose of the invention by being absorbed in absorber 8 into solution III which may have the same components or different components than solution II, provided that it has the same volatile solvent as was used for solution II. The heat evolved by the absorption of solvent vapor II into solution III in absorber 8 is applied to some useful purpose such as heating buildings, heating hot water, or the generation of power, or given off to the atmosphere or other convenient cooling means outside the cycle.

Dilute solution III from absorber 8 passes through line 24 and the counter current heat exchangers 22 and 23 through the pressure reducing means 25 into concentrator 28 where heat $Q_3$ is absorbed at a lower temperature than it is evolved in absorber 8 as $Q_2$. The heat $Q_3$ may be absorbed from the atmosphere for use at a higher temperature as $Q_2$ for some useful purpose, or may be absorbed from some refrigerating, air-conditioning or other similar process and rejected at a higher temperature as $Q_2$.

Solvent vapor II liberated from the concentrator or stripper 28 flows through line 29 and counter current heat exchanger 23 to absorber 20 giving up the heat of absorption in whole or in part to the vaporization of solvent I in the vaporizer 10 which is placed in thermal contact with absorber 20.

The concentrated solution III is circulated by means of pump 26 through line 27 and counter current exchangers 23 and 22 to absorber 8.

Depending upon the thermal properties of solutions II and III used in the cycle shown diagrammatically in Figure 1, it may be necessary to supply additional heat to the vaporizer 10 over that made available to the vaporizer 10 by the absorption of solvent vapor II in absorber 20. In other cases it may be necessary to absorb part of the heat developed by absorption of solvent vapor II in absorber 20; in order to keep the operation in thermal balance.

If additional heat is required in vaporizer 10 this may be obtained by opening valve 31 and closing valve 33 and circulating hot solution III from absorber 8 through line 30 and the heating coil 20a then through line 32 to line 24. In such operation the coil 20a could be placed in vaporizer 10 rather than in absorber 20 for greater efficiency. If heat is to be absorbed from absorber 20 this may be accomplished by closing valve 34 and opening valve 36 so that the cold solution III leaving concentrator or stripper 28 will be circulated by pump 26 through line 35 and coil 20a and lines 37 and 27 to absorber 8. By proper adjustment of the valves it will be possible to so control the flow of the solutions through the various lines indicated in Figure 1 so as to compensate for any excess or deficiency in the heat evolved in absorber 20.

In such an operation using the concentrator at the lower temperature and the absorber at the higher temperature as is the case with solution III an elevation in boiling point, or decrease in the vapor pressure of a solvent when mixed with a solute causes no difficulty. Solutions such as solution III in concentrator 28 and absorber 8, which would be unsatisfactory for use in concentrator 1 and absorber 9 or in concentrator 3 and absorber 20 may thus be used.

It is clear that modifications may be made in these cycles depending upon the individual operations which it is desired to accomplish. If for example there is an advantage in leaving the superheat in the superheated solvent vapor II leaving solution II in concentrator 3 the line 4 may by-pass heat exchanger 21 and go directly to the prime mover or the other device in which this energy is to be utilized. These diagrammatic cycles are examples in the application of my invention. As indicated in Figure 1, it is necessary to the efficient performance of an absorption refrigeration cycle to transfer heat from a stream of the working substance whose temperature is being reduced, to another stream of the working substance whose temperature is being increased. This is accomplished by heat exchangers, such as 11, 21, 22 and 23 in Figure 1.

Counter current heat exchangers have heretofore been employed for this purpose, in which the sensible heat of the working fluid being cooled is conducted through a partition wall between the two streams, and increases the sensible heat and temperature of the other stream. In the standard ammonia absorption refrigeration process, for example, the ammonia is evolved at high pressure from a water solution in a still composed of an analyzer and generator, and the strong liquor at high temperature, thus formed, flows through a counter current heat exchanger, through which the weak liquor from the absorber at a lower temperature is pumped back to the still.

The streams of working substance flowing through counter current heat exchangers of this sort need not be confined to the water ammonia liquor or solution, but may be composed of pure solvent. For example, heat may be exchanged in this manner between the liquid ammonia flowing from the condenser to the vaporizer, and the ammonia vapor flowing from the vaporizer to the absorber.

According to one feature of my invention, counter current heat exchange is accomplished by an exchange of latent heat, rather than of sensible heat. The sensible heat released by the reduction in temperature of the one stream is converted into latent heat by vaporizing some of the solvent, and this heat is transferred in the solvent vapor to the other stream where, due to the condensation of the vapor in the solution, it is liberated and absorbed by the sensible heat change accompanying the rise in temperature of the second stream.

With the usual type of heat exchanger involving only sensible heat changes in the working substances, and particularly if these working substances are of a viscous nature, large and expensive heat exchangers may be necessary and an undesirable amount of the working substances may be required, which may add greatly to the expense and size of the apparatus. With the method of resorption heat exchange, however, this difficulty may to a great extent be overcome and the requisite heat transfer between the two streams of working substance accomplished in an efficient and economical manner.

Another advantage will be seen to lie in the possibility, afforded by my method, of increasing the concentration of the solution contained in the absorber and consequently increasing the temperature at which heat is rejected from the cycle. In a solution refrigeration cycle when the upper temperature of the cycle is limited by the source of heat supply as, for example, if the cycle is required to operate on the heat of condensation of steam at atmospheric pressure, or 212° F., we find that with the usual method of counter flow heat exchangers, there results a corresponding limitation to the temperature of heat rejection.

This may be illustrated by taking an aqueous solution of sodium hydroxide for the working medium in a refrigeration cycle operated within the temperature range 192° F. and 40° F., and using the customary heat exchanger. Assuming 55 per cent NaOH in the concentrator and 50 per cent NaOH in the absorber, with a divergence from the boiling point in the latter of 10° F., we find for the temperature of heat exit: condenser 107° F., and absorber 106° F.—10°=96° F. If, in place of the usual heat exchanger, there is substituted my resorption heat exchanger, raising thereby the absorber concentration to 52½ per cent NaOH, we find that heat is rejected from the absorber at 111° F.—10°=101° F. On the other hand we may leave the absorber concentration at 50 per cent NaOH and use 52½ per cent NaOH in the concentrator, when the condenser temperature becomes 113° F.

Apart from the advantages enumerated above, which have principally to do with improving the design and practical operating details of the cycle, a distinct thermodynamic advantage is obtainable by my method of resorption heat exchange. Thus it will be observed that in the usual form of a solution refrigeration cycle the sensible heat of the liquid solvent, between the temperature of the condenser and the temperature of the vaporizer, operates to reduce the refrigeration effect and lessen the coefficient of performance of the cycle. Some of this heat may be used reversibly to superheat the solvent vapor before it is combined with the solution in the absorber where the combination of vapor superheated to the temperature of the solution constitutes a reversible process from a thermodynamic viewpoint. Owing, however, to the specific heat of the vapor being less than that of the liquid, a considerable part of the heat in the condensate above the refrigeration temperature level cannot be utilized in this manner and has heretofore occasioned a loss in efficiency in the performance of such cycles. With the use of my resorption heat exchanger, on the other hand, sufficient condensate may be vaporized, at pressures varying from the condenser pressure to that existing in the vaporizer, so as to cool the condensate to the refrigeration temperature. The vapor thus formed may in turn be absorbed in the stream of solution flowing from the absorber to the concentrator, in which stream the same range of pressures is found as between the condenser and the vaporizer, that is, the pressure in the condenser is the same as in the concentrator and the pressure in the vaporizer is the same as in the absorber.

The method of operation will be made clear in connection with Figures 2 to 11 of the drawings.

Figure 2:
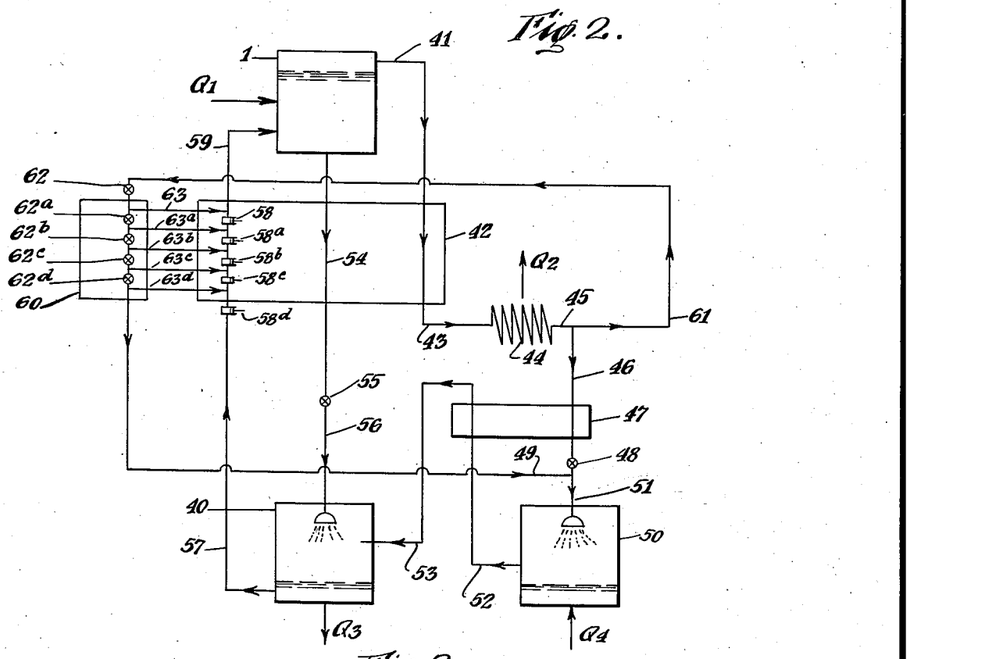
Figure 2 shows a process involving a resorption heat exchanger.
Figure 3:
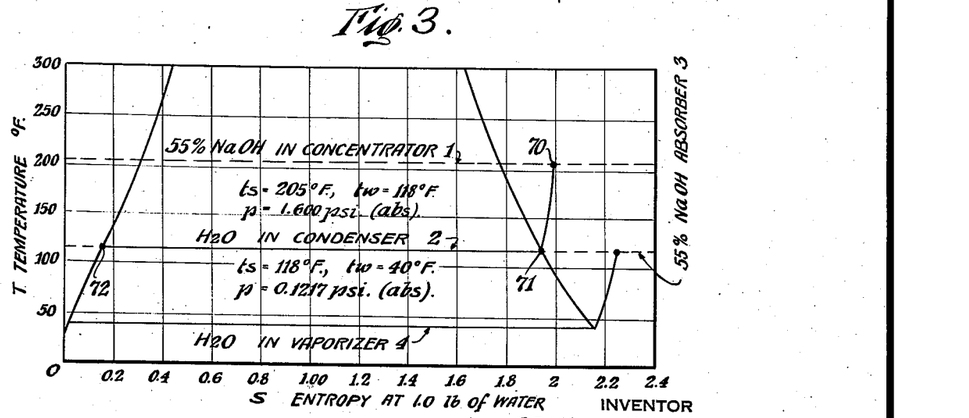
Figure 3 is a diagram to accompany Figure 2.

Referring to Figure 2, which represents a conventional solution refrigeration cycle with the addition of my resorption heat exchanger method, vessel 1, the concentrator, contains, for example, an aqueous solution of sodium hydroxide having a concentration, referred to the total weight of the solution, of 55 per cent NaOH. As the diagram represents an ideal case and is designed to show the thermodynamic efficiency, this same concentration is used in the absorber, vessel 40 and no divergence from the boiling point temperature is allowed in the latter vessel. Heat $Q_1$, is applied to vessel 1 and solvent vapor (steam) is formed, which passes through line 41, heat exchanger 42 and line 43 to the condenser 44. In the heat exchanger 42 the superheat in the vapor, represented by 70—71 in Figure 3, is removed and the vapor enters the condenser 44 in a dry and saturated condition. Here it condenses along the line 71—72 of Figure 3, rejecting the heat $Q_2$ from the cycle at the temperature $t_w=118°$ F., and passes out through the line 45 in a liquid condition.

From line 45 part of the condensate flows through line 46 heat exchanger 47 pressure reducing means 48 and, in conjunction with the condensate from line 49 enters the vaporizer 50 through line 51 at temperature $t_w=40°$ F. Heat $Q_4$ is added to vaporizer 50 with the formation of dry and saturated vapor which leaves through line 52, passes through heat exchanger 47, where it is superheated to 118° F., and enters the absorber 40 through line 53. Solution enters the absorber 40 from the concentrator 1 by way of line 54, heat exchanger 42, pressure reducing means 55 and line 56 and is combined in a reversible manner with the superheated vapor from line 53 rejecting the heat of combination $Q_3$ from the cycle. Solution leaves the absorber 40 through line 57 a series of pressure increasing means or pumps 58, 58a, 58b, 58c, 58d, heat exchanger 42 and line 59 to concentrator 1. As heat exchanger 42 evidently cannot supply enough heat to raise the temperature of the solution, flowing from the absorber 40 to the concentrator 1, to 250° F., which is the temperature of the boiling solution in the latter vessel, the resorption heat exchanger 60 supplies what is required. To this vessel 60 a part of the condensate from line 45 is conducted by line 61 and successively reduced in pressure by the pressure reducing means 62, 62a, 62b, 62c and 62d. This reduction in pressure on the condensate causes evaporation of part of the solvent liquid, the heat of vaporization being supplied from the sensible heat of the condensate (solvent liquid), which after being superheated by heat from heat exchanger 42 passes into line 59 through lines 63, 63a, 63b, 63c and 63d, being condensed in the solution flowing through line 59 and raising its temperature thereby.

As a result of this operation the condensate in line 61 is reduced in temperature to the temperature of the vaporizer 50 into which it flows through lines 49 and 51.

Figure 4:
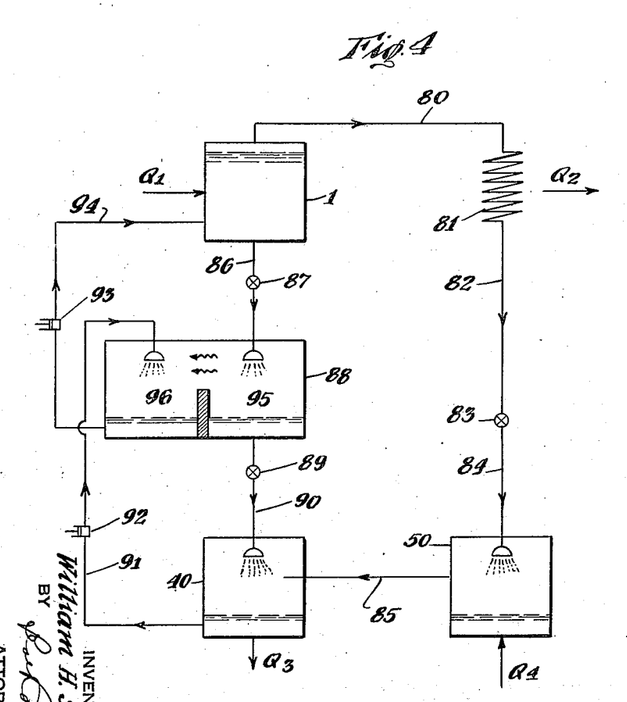
Figure 4 shows a modified resorption cycle.

Figure 4 shows a simpler use of the resorption heat exchanger, in which no other form of counter flow heat exchanger is employed. In this figure, heat $Q_1$ is added to the concentrator, vessel 1, and the vapor evolved passes directly through line 80 to condenser 81 where it is condensed, rejecting the heat $Q_2$. The condensate passes through line 82, pressure reducing means 83 and line 84 to vaporizer 50. Heat $Q_4$ is added to vaporize the condensate, which then passes through line 85, to absorber 40 where it combines with the solution received from the concentrator 1 through line 86, pressure reducing means 87, the resorption heat exchanger 88, pressure reducing means 89 and line 90, rejecting the heat $Q_3$.

The diluted solution passes from absorber 40 to concentrator 1 through line 91, pump 92, the resorption heat exchanger 88, pump 93 and line 94. In the resorption heat exchanger 88, solvent vapor is flashed, i. e., vaporized from the solution under the reduced pressure caused by the pressure reducing means 87, and reduces the temperature of the concentrated solution. The solvent vapor thus formed passes from the right hand compartment 95 of the resorption heat exchanger 88 into the left hand compartment 96, as indicated by the arrows in the figure, and is absorbed by the dilute solution flowing into the compartment through line 91, raising its temperature thereby. The dilute solution is by this operation raised in temperature, and the concentrated solution lowered in temperature, which is one of the purposes of the heat exchanger.

Figure 5:
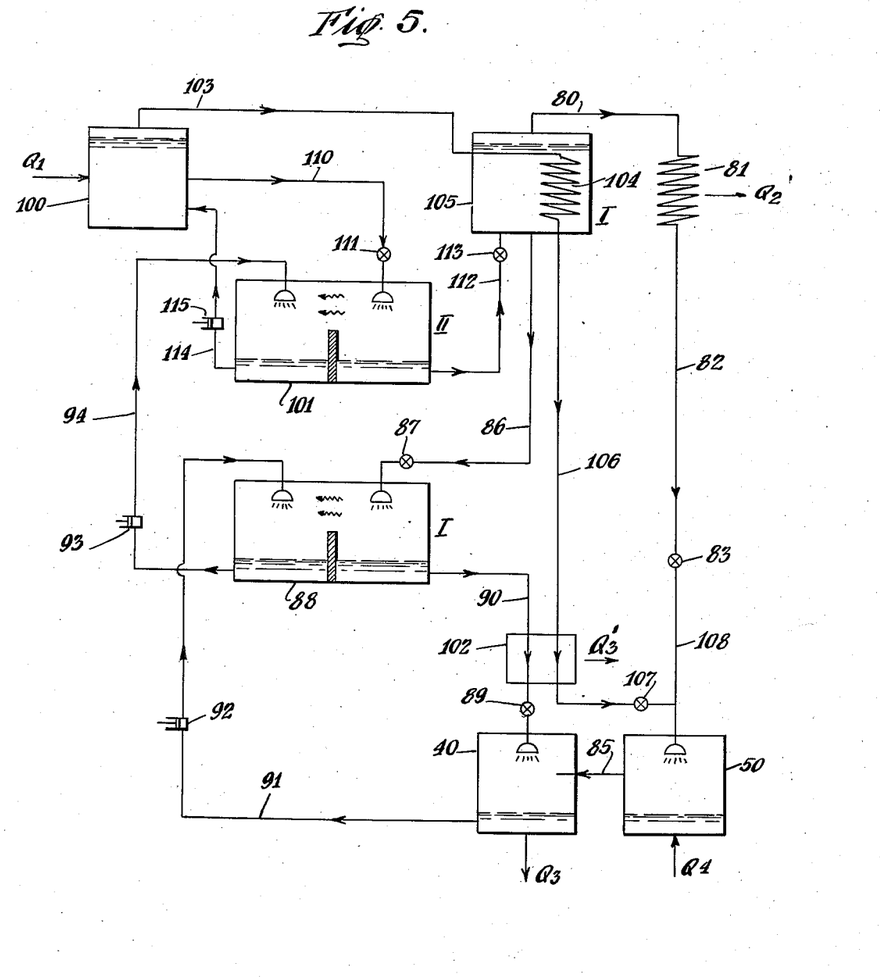
Figure 5 shows a further modification.

Figure 5 shows the application of the resorption heat exchanger method to a double effect solution refrigeration cycle. In Figure 5 an additional concentrator 100 and resorption heat exchanger 101 are added to the single effect cycle shown in Figure 4. A precooler 102 is also added to the Figure 4 arrangement. Heat $Q_1$ is supplied to concentrator 100 and solvent vapor passes off through line 103 to a coil 104 located in the solution contained in the concentrator 105 where it condenses, supplying the heat necessary to operate the concentrator 105, and the condensate passes through line 106, precooler 102, pressure reducing means 107 and line 108 to the vaporizer 50. Concentrated solution leaves concentrator 100 through line 110 and after passing through the pressure reducing means 111 enters the resorption heat exchanger 101 which operates in a similar manner to the resorption heat exchanger 88 previously described in connection with Figure 4. Concentrated solution leaves resorption heat exchanger 101 through line 112 and after passing through the pressure reducing means 113 enters concentrator 105. The feed for concentrator 100 is received from the resorption heat exchanger 101 through line 114 and pump 115. The purpose of the precooler 102 is to reduce the temperature of the condensate before it enters vaporizer 50, and thus increase the amount of the refrigeration effect $Q_4$. It also reduces the temperature of the concentrated solution going to absorber 40 and correspondingly reduces $Q_3$.

Figure 6:
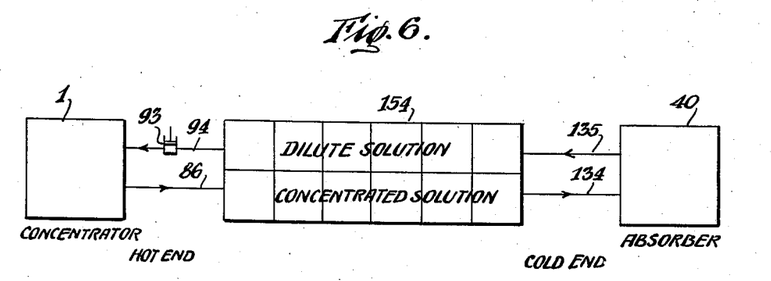
Figures 6, 7 and 8 illustrate one form of resorption heat exchanger.
Figure 7:
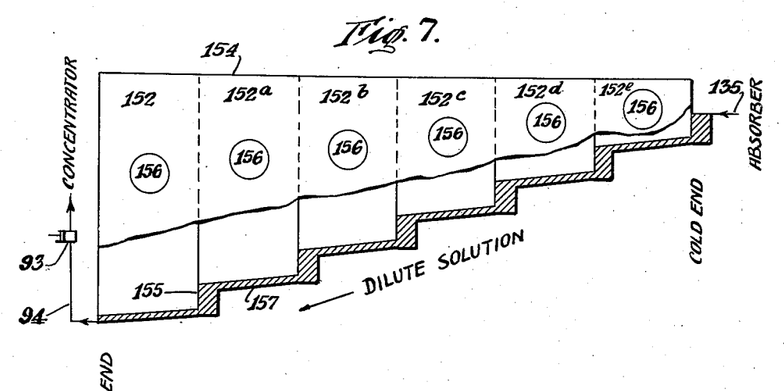
Figure 8:
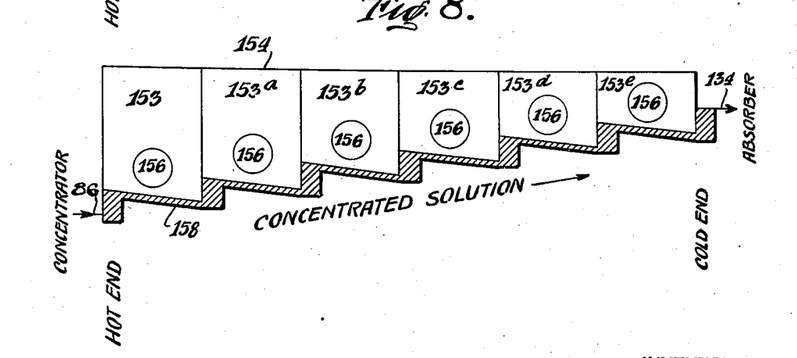

Referring to Figures 6, 7 and 8 which show a multistage resorption heat exchanger, it will be observed that advantage of hydrostatic head is taken to cause the flow of solution through the compartments 152—152e and 153—153e of the resorption heat exchanger 154, without requiring the use of pumps or other mechanical devices. Assume an aqueous solution of sodium hydroxide, for example, as the working fluid, with a condenser temperature of 100° F. and a refrigeration temperature of 40° F. The pressures in the concentrator 1 and the absorber 40 are, of course, those corresponding to these saturated temperatures, or

| Item | Concentrator 1 | Absorber 40 |
|---|---|---|
| Pressure, psi. (abs.) | 0.9487 | 0.1217 |
| Temperature, °F. | | |
| — saturated vapor | 100 | 40 |

Assuming the solution to weigh about 100 lbs. per cu. ft. the pressure difference between the concentrator and the absorber corresponds to a total hydrostatic head of about:

$$\frac{(0.9487-0.1217)}{100 \text{ lbs per cu. ft.}}(144)=1.19 \text{ ft.}$$

which divided between the compartments shown in the figure results in a change in level in passing from one compartment to the next of about 0.2 ft. Thus, as the vapor pressure diminishes successively in each compartment from left to right, equilibrium is maintained by the higher pressure in the left hand compartment, as 152, being balanced by the lesser pressure in the right hand compartment, as 152a, plus the hydrostatic head of the solution in the sump 155. The compartments through which the concentrated solution flows communicate, by means of the openings 156, with the corresponding compartments on the dilute solution side, for the passage of the solvent vapor which is being vaporized from the concentrated solution and absorbed in the dilute solution. To establish flow through the compartments any convenient arrangement may be adopted; that shown in Figures 7 and 8 consists of inclined plates down which the solution flows by gravity, as shown by the plate 157 in Figure 7 and plate 158 in Figure 8.

Figure 9:
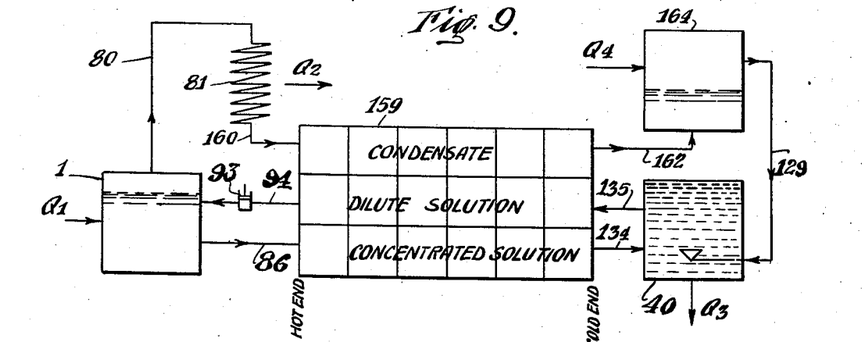
Figures 9 and 10 show a modified heat exchanger.
Figure 10:
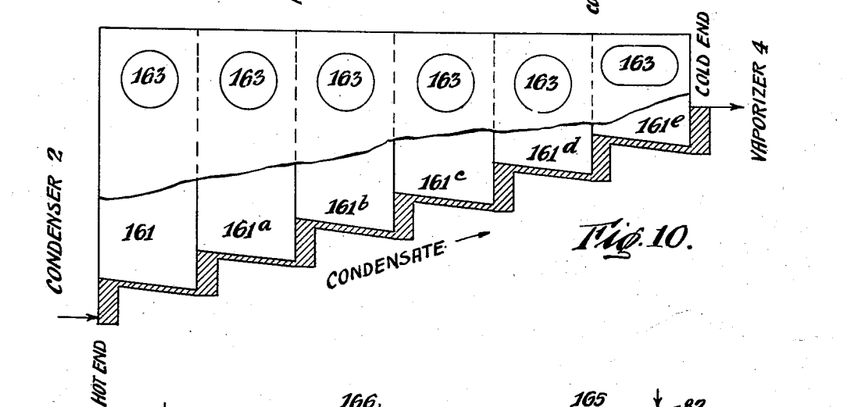

Figure 9 shows the addition of condensate flow to the multi-stage resorption heat exchanger. The three way heat exchanger 159 is similar in operation to the two way exchanger 154 illustrated in Figures 6, 7 and 8. It will be noted, however, that the total hydrostatic head, due to the weight of the condensate being less than that of the solution, is more than 1.19 ft. and amounts to:

$$\frac{100 \text{ lbs. per cu. ft. of solution}}{62.2 \text{ lbs. per cu. ft. of water}} \times 1.19 \text{ ft.} = 1.91 \text{ ft.}$$

The condensate from the condenser 81 flows through the line 160, the flashing chambers 161—161e, and the line 162 into the vaporizer 164. The vapor from the condensate passes through the openings 163 into the corresponding compartments 152—152e of the dilute solution line, similar to that shown in Figure 7, where it is absorbed by the latter solution.

As an illustration of the performance obtained with the resorption heat exchanges, the cycle shown in Figure 4 may be computed assuming, for example, an aqueous solution of sodium hydroxide as the working substance, and that the following operating conditions are to be complied with:

|  | Degrees Fahrenheit |
|---|---|
| Temperature in concentrator 1 | 192 |
| Temperature in condenser 81 | 107 |
| Temperature in vaporizer 50 | 45 |

Consider that 12 lb. 55% NaOH solution leaves the concentrator in line 86, that the pressure in the heat exchanger 88 is 0.5 psi. (abs.), and that the concentration of the solution leaving it through line 90 is 56%. The 56% solution under 0.5 psi. boils at 165° F., its weight is 11.79 lbs., and the steam flashed from the solution amounts to 0.21 lbs.

$$\frac{56}{56-55}=\frac{56}{1}=56 \text{ lbs. } 55\% \text{ solution per lb. H}_2\text{O}$$

$$\frac{12 \text{ lb. } 55\% \text{ solution}}{56 \text{ lb. per lb. H}_2\text{O}}=0.21 \text{ lb. water flashed}$$

12 lb. 55% solution − 0.21 lb. H$_2$O =
11.79 lb. 56% solution

*Heat balance*

Heat in_______55%, 192° F., 248 B. t. u.×12.00 lb.=2976 B. t. u.
 Total in_________________________________ 2976 B. t. u.
Heat out________ 56%, 165° F., 234 B. t. u.×11.79 lb.=2759 B. t. u.
 H$_2$O 165° F., 0.5 psi., 1134 B. t. u.×0.21= 238 B. t. u.

Total out______________________________ 2997 B. t. u.

Assume a concentration of 51% for the solution leaving the absorber 40 through line 91, we find it has the following properties:

51% $t_w$=45° F., $t_s$=114−10=104° F., 157 B. t. u.×12.95 lbs.=2033 B.t.u $$\frac{51}{56-51}=\frac{51}{5}=10.2 \text{ lbs. } 56\% \text{ solution per lb. H}_2\text{O}$$

$$\frac{11.79 \text{ lb. } 56\% \text{ solution}}{10.2 \text{ lb. per lb. H}_2\text{O}}=1.16 \text{ lb. vapor absorbed in absorber } 40$$

11.79 lb. 56% solution + 1.16 lb. H$_2$O = 12.95 lb. 51% solution

Let $S=$ concentration of solution entering concentrator 1 through line 94.

1.16 lb. $H_2O$ evaporated in concentrator 1
0.21 lb. $H_2O$ exchanged in heat exchanger 88
12 lb. 55% solution+1.16 lb. water=13.16 lb $S\%$ solution entering concentrator 1 through line 94
12.95 lb. 51% solution+0.21 lb. water=13.16 lb. $S\%$ solution leaving heat exchanger 88 through line 94

$$\frac{55}{55-S}=W \text{ lbs. } S\% \text{ solution per lb. } H_2O$$

$$\frac{13.16 \text{ lb. } S\% \text{ solution}}{W \text{ lb. per lb. } H_2O}=\frac{1.16 \text{ lb. water vaporized in}}{\text{concentrator 1}}$$

$$W=\frac{55}{55-S}=\frac{13.16}{1.16}=11.34$$

$$55=(55)(11.34)-(S)(11.34)$$

$$S=55-\frac{55}{11.34}=55-4.85$$

$$S=50.15\%$$

Heat in

With 51% solution = 2033 B. t. u.
With steam       =  238 B. t. u.
                   ————
                   2271 B. t. u.

$$\frac{2271 \text{ B. t. u.}}{13.16 \text{ lb. } 50.15\% \text{ Sol}}=173 \text{ B. t. u./lb. } 50.15\%, 135° \text{ F.}$$

($50.15\%$, $t_w=80°$ F., $t_3=150°$ F. B. P.)

*Heat balance over concentrator 1*

$H_2O$, 1.1675 psi., 192° F., 1146 B. t. u.×1.16 lb.=1329 B. t. u
55%, 192° F., 248 B. t. u.×12.00 lb.=2976 B. t. u.
Total out............................ 4305 B. t. u.
50.15%, 135° F., 173 B. t. u.×13.16 lb.=2271 B. t. u. in
                                       ————
                                       $Q_1$=2034 B. t. u.

*Performance*

$$CP=\frac{Q_4}{Q_1}=\frac{1005 \text{ B. t. u.}\times 1.16 \text{ lb.}}{2034 \text{ B. t. u}}=\frac{1165}{2034}=0.57$$

Figure 11:
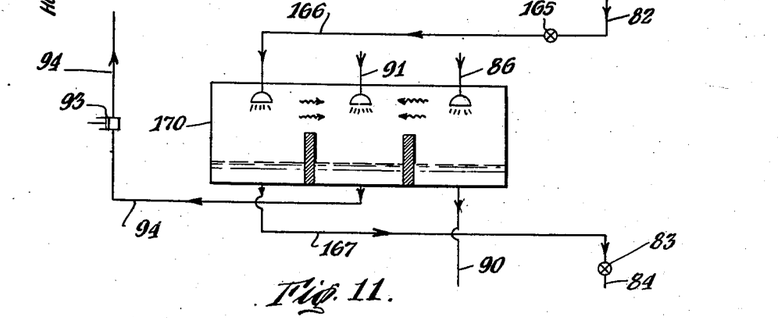
Figure 11 illustrates the connections for a modified heat exchanger in the cycle.

This performance may be improved by adding, as shown in Figure 11, a condensate flash pot to the heat exchanger 88 of Figure 4. In Figure 11 the condensate passes from line 82 through the pressure reducing means 165 and line 166 to the left hand compartment of the three-way heat exchanger 170, where it in part flashes vapor to the dilute solution and passes out through line 167 to the pressure reducing means 83 in the line 84 to the vaporizer 50.

By cooling the condensate in this way before it enters the vaporizer 50, the refrigeration effect $Q_4$ is increased and at the same time the operating heat $Q_1$ is reduced.

It will be seen, without going into a detailed calculation, that the following approximate changes in $Q_4$ and $Q_1$, takes place. Letting $Q'_4$ and $Q'_1$ represent the new values of $Q_4$ and $Q_1$, there results:

$Q_4=1.16$ lb. ($H_{45}-h_{107}=1079.4-74.9=$
$1004.5$)=1165 B. t. u.
$Q'_4=1.16$ lb. ($H_{45}-h_{80}=1079.4-48.0=$
$1031.4$)=1196 B. t. u.

and $Q'_1$ may be assumed approximately equal to $Q_1$
or $Q'_1=Q_1=2034$ B. t. u.

thus giving a performance $$CP'=\frac{Q'_4}{Q'_1}=\frac{1196 \text{ B. t. u.}}{2034 \text{ B. t. u.}}=0.59$$

With the multi-stage heat exchangers shown in Figures 6 and 9 more heat is regenerated and the cycle approaches more closely to a reversible condition. As a consequence the performance is still further improved, although for any practical or actual case the performance must evidently be less than that given by the Carnot equation. The Carnot performance for temperatures of heat input of 192° F. and 45° F., and of heat rejection at 107° F., amounts to:

$$\text{Carnot } CP=\frac{(T_1-T_2)}{(T_1)}\frac{(T_4)}{(T_2-T_4)}=$$

$$\frac{(192-107)}{(192+460)}\frac{(45+460)}{(107-45)}$$

$$=\frac{(85)}{(652)}\frac{(505)}{(62)}=\frac{42925}{40424}=1.06$$

In the cycles described above a liquid working substance has been employed. Dry absorbents are some times used in refrigeration processes and various adsorbents have been also used in such processes. Dry absorbents, such as calcium ammoniate for example, require periodic or intermittent operation and the heat or availability losses incurred at the end of each period, when the absorbent substance is alternately cooled and heated, constitute a serious obstacle to the efficient operation of such a cycle. The same is true when an adsorbent, such as silica-gel or activated aluminia for example, is used in the cycle.

In my method of changing the sensible heat of the working substance by utilizing the latent heat of the vapor evolved or absorbed, these losses may be much reduced. Thus if in Figure 4 we suppose silica-gel to be substituted in place of sodium hydroxide, the cycle operating intermittently, and at the end of a period the pressure in concentrator 1 is reduced and in absorber 40 is increased to the intermediate pressure which obtains in exchanger 88, the temperature of the silica-gel in concentrator 1 is reduced and that in absorber 40 increased for the same reason that applied in the case of the liquid solution already discussed.

One specific example of a small solution cycle unit for air conditioning is illustrated in Figures 12 to 21 inclusive. In the unit described herein, aqueous solutions of lithium bromide are used as these materials are non-corrosive, permitting the use of steel construction and are much better adapted to the temperature range contemplated in air-cooling or air-conditioning units than ammonia. This type of unit lends itself readily to quantity production, is easily installed and readily adapted to a range in capacity by using one or more units in parallel.

Figure 12:
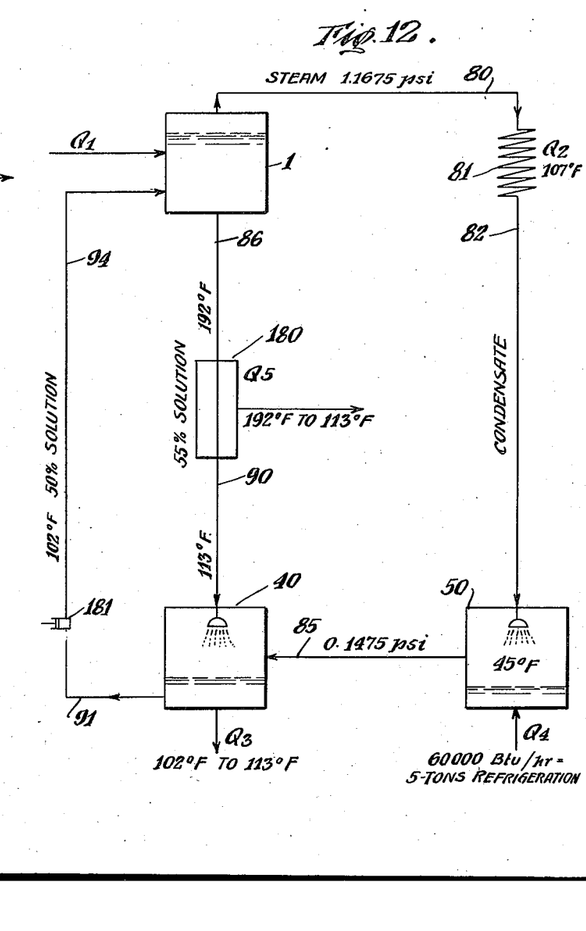
Figure 12 is an example of a small unit for refrigeration.

The simplest form of cycle is shown diagrammatically in Figure 12 and consists of the evaporator or concentrator 1 in which the solution is concentrated, the condenser 81, the vaporizer 50, and the absorber 40. Heat $Q_1$ enters the cycle at the higher temperature level in the evaporator 1, and $Q_4$ at the lower temperature level in the vaporizer 50, and is rejected $Q_2$ and $Q_3$ at the intermediate temperature level of the condenser 81 and the absorber 40 and in the cooler 180 which serves to cool the concentrated solution flowing from the evaporator to the absorber. A circulating pump 181 is required to deliver the dilute solution from the absorber to the concentrator, and a dry vacuum pump may also be used to keep the system free of non-condensible gases. These are the only moving parts required in the cycle itself. If the chilled water in vaporizer 50 is to be circulated a water-circulating pump will also be necessary as in any such system.

The temperatures, pressures, concentrations and quantities indicated in Figure 12 correspond to a nominal 5-ton refrigerating unit such as is considered adaptable to air conditioning. For a 5-ton unit it would be necessary for 59.6 pounds of water per hour to flow through the line 82 including condenser 81 and vaporizer 50, 596 pounds of 55% solution to flow through lines 86, 90 from concentrator 1 to absorber 40 and 655.6 pounds of 50% solution per hour through lines 91, 94 from absorber 40 to concentrator 1. The heat flow quantities would be as follows:

$Q_1 = 118,600$ B. t. u. per hour
$Q_2 = 63,500$ B. t. u. per hour
$Q_3 = 79,100$ B. t. u. per hour
$Q_4 = 60,000$ B. t. u. per hour
$Q_5 = 36,000$ B. t. u. per hour The heat input to the system, of course, balances the heat output from the system:

$$Q_1 + Q_4 = Q_2 + Q_3 + Q_5$$

The coefficient of performance will then be:

$$C.P. = \frac{Q_4}{Q_1} = 0.506$$

Figure 13:
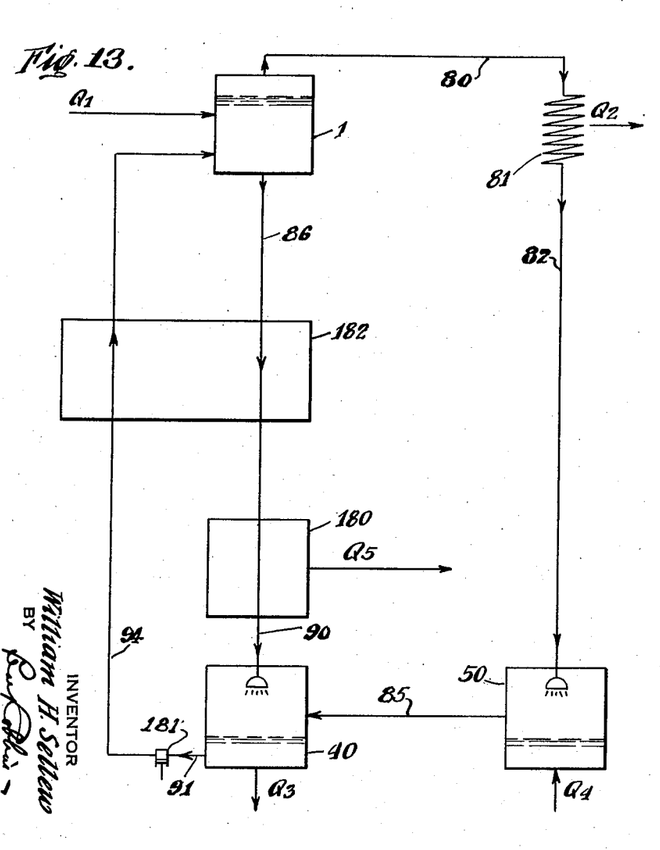
Figure 13 is a modification of the unit of Figure 14.

Further development of the cycle is indicated in Figure 13 by the inclusion of a standard counter-current heat exchanger 182 to cool the concentrated solution leaving the concentrator 1 and transfer this heat to the dilute solution flowing to the concentrator. This may raise the temperature of the 50% solution from 102° to 163° F. and decrease the temperature of the 55% solution from 192° F. to 122° F. The required heat input to the cycle is thereby greatly reduced, the heat flow quantities now being as follows:

$Q_1 = 87,400$ B. t. u. per hour
$Q_2 = 63,500$ B. t. u. per hour
$Q_3 = 79,100$ B. t. u. per hour
$Q_4 = 60,000$ B. t. u. per hour
$Q_5 = 4,800$ B. t. u. per hour The coefficient of performance will then be $$C.P._t = 0.686$$

It will be noted that the cooler 180 is still included but its duty is greatly reduced by the function of the counter-current heat exchanger 182. Similarly the heat quantity $Q_1$ is also reduced.

Although the performance of the cycle shown in Figure 13 is considerably superior to that of the cycle shown in Figure 12, the increased initial cost due to the large surface required in the heat exchanger section, and the large quantity of solution required to fill this heat exchanger, is a serious disadvantage.

Figure 14:
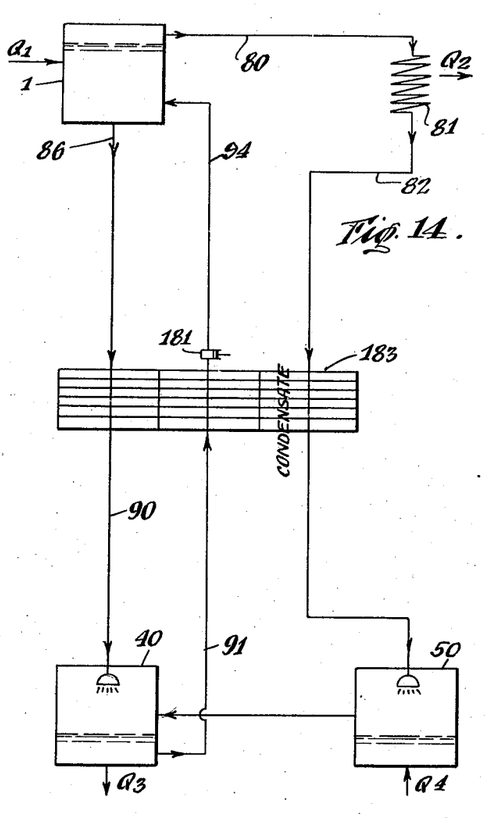
Figure 14 is a further modification involving a resorption heat exchanger.

The cycle shown in Figure 14 uses a resorption heat exchanger 183. This exchanger, as previously described, is actually a series of vaporizers and absorbers operating at different temperature and pressure levels. It accomplishes, however, the results of a complicated three-pass counter-current heat exchanger, but without the use of heat transfer wall surfaces. The cooling of the concentrated solution and of the condensate is accomplished by the removal from the concentrated solution and condensate of vapor, which vapor is absorbed by the dilute solution thereby heating the dilute solution on its way from the absorber 40 to the concentrator 1. Sections of a form of resorption heat exchanger 183 suitable for the present purpose are shown in Figures 17 to 21, inclusive.

An important function of this resorption exchanger is the transfer of the sensible heat of the condensate to the dilute solution. The effect of this is to give more refrigeration per pound of refrigerant vaporized. It is evident, that this is inherently impossible in the conventional counter-flow heat exchanger, when it is considered that the sensible heat is given off by the condensate in a temperature range between 107° F. and 45° F. while the dilute solution which must absorb this heat is in the higher temperature range of 106° F. to 168° F. The use of the conventional exchanger inherently increases the load on the vaporizer; by about 6 per cent in the five ton unit (Figure 13) under consideration.

Another advantage of the resorption exchanger is the further concentration of the solution flowing from the concentrator 1 to the absorber 40, and the further dilution of the solution flowing from the absorber to the concentrator. Thereby the average concentration of the solution entering the absorber 40 through line 90 is greater than that of the solution leaving concentrator 1 through line 86. This condition allows a higher temperature in the condenser 81 and the cooling water for absorber 40 or a lower temperature in the concentrator 1 or vaporizer 50. In the type of unit under consideration the practical advantage obtained is the ability to use a lower pressure in the boiler supplying steam for operating the concentrator or a higher temperature of the cooling water, than can be tolerated in any equivalent cycle using a conventional type heat exchanger.

In Figure 14 the resorption exchanger 183 is shown as including six steps, or units, each unit comprising three compartments which are connected together by inter-communicating openings in the vapor phase. The six equilibrium units comprising this exchanger were calculated according to the flow diagram, Figure 15.

Figure 15:
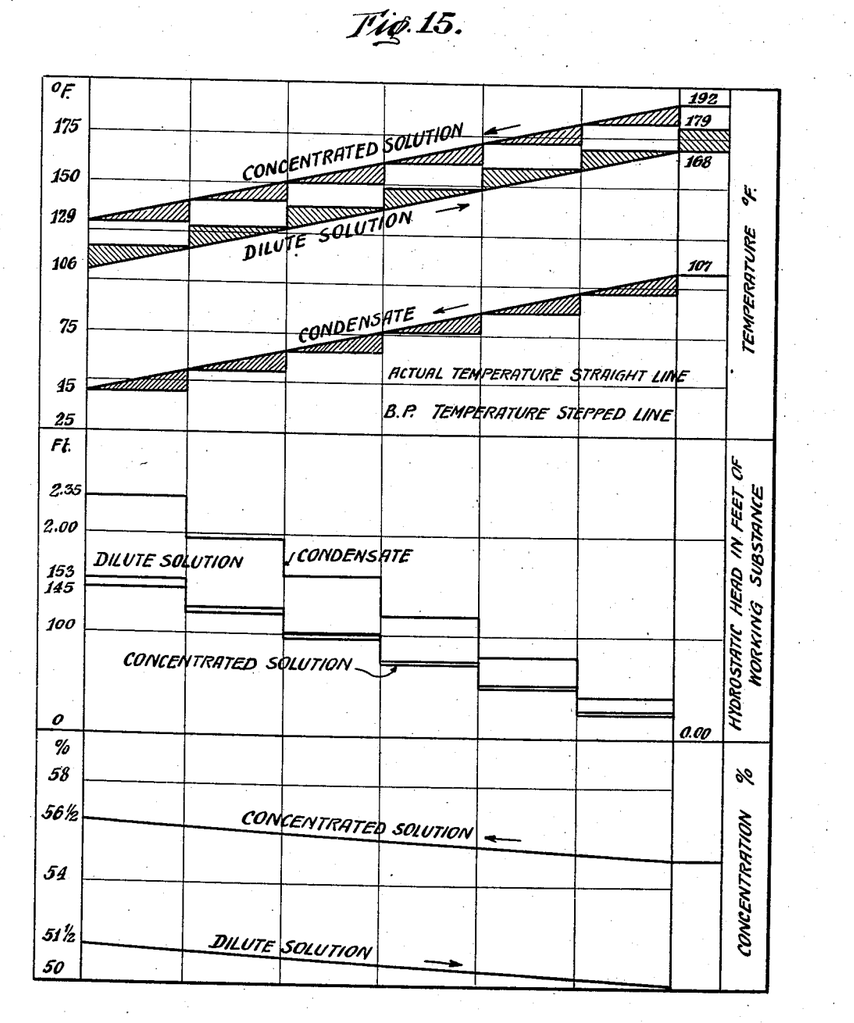
Figure 15 is a diagram to accompany Figure 14.
Figure 16:
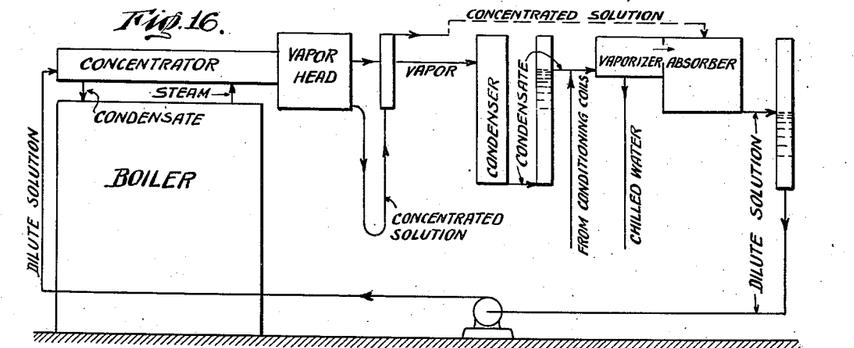
Figure 16 is a diagrammatic view of the arrangement of the parts of a unit.
Figure 17:
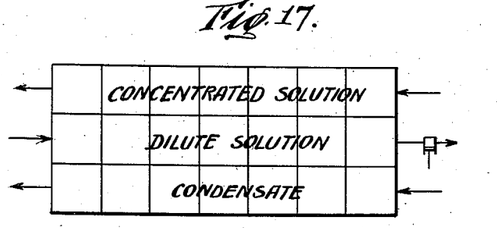
Figures 17 to 21 inclusive are views of a further modified resorption heat exchanger.
Figure 18:
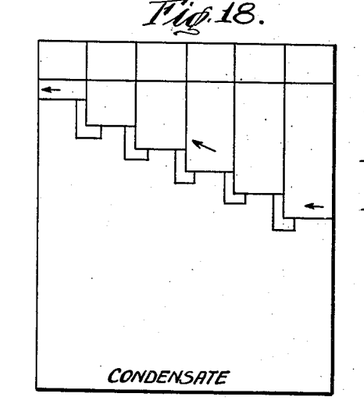
Figure 19:
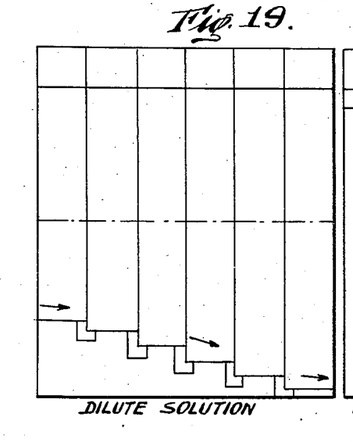
Figure 20:
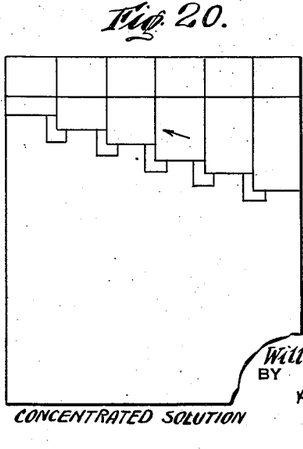
Figure 21:
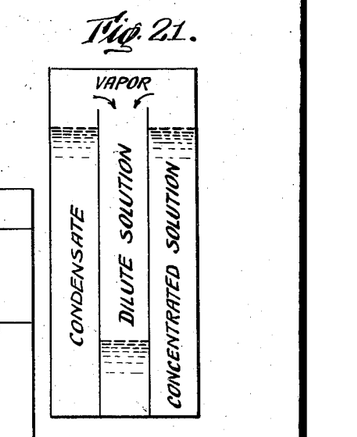

The top diagram in Figure 15 indicates the temperature of the concentrated solution, of the dilute solution, and of the condensate as they flow through the resorption exchanger 183 of Figure 14. The straight lines designated at "actual temperature" indicate the temperature of the solution or condensate at it enters the exchanger and each unit, or step, thereof. The stepped line indicates the boiling point under the existing pressure, of the solution or condensate in each compartment of the six units in the exchanger. It is seen that the boiling point and the actual temperature coincide at the exit of each compartment in the exchanger. This is the same as assuming that equilibrium conditions are attained in each unit and that the concentrated solution, dilute solution, and condensate are each at its boiling point under the existing pressure as they leave each compartment.

Due to the vaporization and condensation which occur in each unit, the concentrated solution becomes more concentrated and the dilute solution becomes more dilute as indicated in the bottom diagram of Figure 15. Each of the units operates at a different pressure which is determined by the concentration and temperature of the fluids therein. These pressures have been converted into hydrostatic head in feet of the fluid in each compartment as shown in the central diagram of Figure 15.

These levels as indicated in the central diagram of Figure 15 are not absolute levels in the sense that the fluid in each compartment of a resorption exchanger must be at the absolute level indicated in Figure 15 but are relative levels which indicate the gradient in head of each particular fluid as it flows through the successive units of the resorption exchanger. The concentrated solution may be 5 or 6 feet or more above the level of the dilute solution in the units, but the liquid level of the concentrated solution in the succeeding equilibrium units will rise as indicated in Figure 15 as the concentrated solution flows from right to left and becomes more concentrated. The dilute solution discharged from the absorber may be available at a low level 5 or 6 feet or more below the concentrated solution when entering the resorption exchanger but the level of the dilute solution in the successive units will decrease as indicated in the central diagram of Figure 15 as the dilute solution flows from left to right.

It is substantially immaterial what the absolute level of the various fluids may be as the resorption exchanger functions by the free interchange of vapor between the two solutions and the condensate in each unit in the exchanger. This makes it possible to operate the entire cycle by a single pump, if the concentrator, absorber and condenser are located at the proper levels to provide for the flow of concentrated solution and condensate by gravitational head, as is suggested in Figure 16.

Since the quantities of vapor transferred in the resorption exchanger may be relatively small, the size of each unit may also be small and need provide only sufficient surface to disengage or to absorb the required amount of vapor, and to have a sufficiently large inter-communicating area to pass the vapor without appreciable restriction.

Liquid seals as indicated in Figures 17 to 21 must be provided between the successive units so as to maintain the hydrostatic head after they are set up as indicated in Figure 15. The quantity of solution in the resorption exchanger may be reduced to an extremely small minimum by arranging the levels of the floors of the successive compartments according to the levels indicated in Figure 21. There would then be required only a thin film of solution flowing over the floor of each compartment in each unit.

The inter-communicating vapor passages should be located at sufficient height above the expected levels of fluid to allow for higher levels which might be encountered in starting up the unit and before steady states as to temperature, pressure and concentration are attained.

The operation of the unit of Figure 14 to produce 5 tons of refrigeration capacity would require 59.7 pounds of water per hour to be vaporized in concentrator 1 and flow through line 80 to condenser 81. In exchanger 183 about 3.4 pounds of water per hour is vaporized from the condensate from line 82 and 15.8 pounds per hour from the 55% solution in line 86 and this combined vapor is condensed in the 51½% solution entering the exchanger from line 91. This would allow 56.3 pounds per hour to be vaporized in vaporizer 50. 597 pounds per hour of 55% solution would leave concentrator 1 through line 86 and 656.7 pounds per hour would enter through line 94. 581.2 pounds per hour of 56½% solution would reach absorber 40 through line 90 and 637.5 pounds would leave absorber 40 per hour through line 91.

The heat flow quantities would be as follows:

$Q_1 = 85,000$ B. t. u. per hour
$Q_2 = 63,500$ B. t. u. per hour
$Q_3 = 81,500$ B. t. u. per hour
$Q_4 = 60,000$ B. t. u. per hour The coefficient of performance is thereby increased to 0.706, largely because of the heat transferred from the condensate to the dilute solution. With an infinite number of such equilibrium units in a resorption exchanger the coefficient of performance would be 0.753.

The six equilibrium units of Figure 14 may be equivalent to as many as 10 or 12 actual units, depending upon the ease with which equilibrium is approached in such equipment. As indicated in Figure 15, a 10° F. difference between actual and equilibrium has been allowed at the entrance of each compartment with the assumption of equilibrium conditions at the exit of each compartment. Twelve steps would allow for a difference of about 5° F. on each solution, or a total difference of about 10° F. between actual and equilibrium conditions at the exit of each unit. This is the same difference which has been allowed in the calculation of the main absorber 40 as shown in the various cycles.

It is believed that the use of the resorption exchanger including the concentrated and dilute solution in exchange with the condensate will enable the manufacturer to obtain a most efficient cycle at no additional cost for equipment or solution. If one compares the larger heat quantities that must be handled in the cycle of Figure 12 with the smaller quantities required by the more efficient cycle of Figure 14, it appears that the size of the concentrator, and the elimination of the cooler 180 would pay for the complete resorption exchanger 183 of Figure 14.

The resorption exchanger is of practical value not only in the small type of unit described herein, but also in the large high duty units whose initial cost can be greatly reduced by the use of the resorption exchanger.

In some instances it may be possible to utilize the lithium bromide solution at a certain stage in the cycle for the dehumidification of the air being conditioned. The air may be passed through a packed pre-drying tower through which the lithium bromide solution is passed. This involves little or no extra equipment when refrigeration is accomplished by a solution cycle using lithium bromide as recommended herein, and offers the advantages of dehumidification without cooling the air to its dew point—a higher refrigeration temperature, which allows higher absorber and condenser temperatures or an increase in the coefficient of performance. The higher temperatures for the absorber and condenser would simplify the development of an air-cooled solution cycle, air-conditioning unit.

For these reasons the ease and simplicity of incorporating direct drying of air in a solution cycle are important advantages which must not be overlooked.

I have described the small solution cycle unit above as using lithium bromide solution. Another solution which may be even more advantageous comprises using lithium bromide and lithium chloride together in the solution.

Since the coefficient of performance when heating is a whole unit greater than the coefficient of performance when refrigerating $$C.P._{\text{Heating}} = 1 + C.P._{\text{Refrigerating}}*$$

*(See G. G. Brown article in J. Franklin Inst., vol. 219, No. 4, p. 405, April, 1935.)

the solution cycle which is operated by heat energy offers large savings in fuel when adapted to "reversed Carnot" heating. This provides heating in winter by simply reversing the refrigeration cycle used in summer.

While a unit has been described involving a single-effect cycle, it is also contemplated that multiple-effect units could be provided.

While the present invention, as to its objects and advantages, has been described herein as carried out in specific embodiments thereof, it is not desired to be limited thereby but is intended to cover the invention broadly within the spirit and scope of the appended claims.

What is claimed is:

1. In a cyclic process utilizing at least two solutions having a common solvent, the steps including vaporizing solvent from the second of said solutions, absorbing said vaporized solvent into the first of said solutions at a temperature at least as high as the temperature of vaporization from said second solution and absorbing the entire heat effect accompanying said vapor absorption in a medium within said cycle, and subsequently rejecting said absorbed heat from the cycle at a higher temperature.

2. A refrigerating system comprising a high-temperature vaporizing chamber, a solution therein having a volatile solvent, means for supplying heat to said solution and vaporizing said solvent, a vapor passage carrying vapor from said first chamber, a condenser in series therewith, a low-temperature vaporizing chamber fed by said condenser, an absorption chamber, a vapor passage carrying vapor from said low-temperature vaporizing chamber to said absorption chamber, a liquid passage carrying concentrated solution from said high-temperature chamber to said absorption chamber, and a second liquid passage carrying dilute solution from said absorption chamber to said high-temperature chamber and a heat exchanger having passages which permit passage of vapor from one of the said liquid passages to the other, the system being so constructed that the temperature, pressure and concentration relations in the heat exchanger insure the concentrated solution to be at a temperature above its boiling point and the dilute solution below the boiling temperature sufficient to cause vapor to pass from the one to the other solution.

3. A refrigerating system comprising a high-temperature vaporizing chamber, a solution therein having a volatile solvent, means for supplying heat to said solution and vaporizing said solvent, a vapor passage carrying vapor from said first chamber, a condenser in series therewith, a low-temperature vaporizing chamber fed by said condenser, an absorption chamber, a vapor passage carrying vapor from said low-temperature vaporizing chamber to said absorption chamber, a liquid passage carrying concentrated solution from said high-temperature chamber to said absorption chamber, and a second liquid passage carrying dilute solution from said absorption chamber to said high-temperature chamber and a resorption heat exchanger having passages in series with the three liquid passages carrying concentrated and dilute solution and condensate from said condenser, said heat exchanger passages permitting the passage of vapor from the condensate line and from the concentrated solution line to the dilute solution line, the system being so constructed that the temperature, pressure and concentration relations in the heat exchanger insure the concentrated solution to be at a temperature above its boiling point and the dilute solution below its boiling point sufficient to cause vapor to pass from the concentrated solution to the dilute solution, and the temperature and pressure relations of the condensate line with respect to the dilute solution line being such as to cause vapor to pass from the condensate to the dilute solution.

4. A refrigerating system comprising a high-temperature vaporizing chamber, a solution therein having a volatile solvent, means for supplying heat to said solution and vaporizing said solvent, a vapor passage carrying vapor from said first chamber, a condenser in series therewith, a low-temperature vaporizing chamber fed by said condenser, an absorption chamber, a vapor passage carrying vapor from said low-temperature vaporizing chamber to said absorption chamber, a liquid passage carrying concentrated solution from said high-temperature chamber to said absorption chamber, and a second liquid passage carrying dilute solution from said absorption chamber to said high-temperature chamber and a resorption heat exchanger having passages in series with the three liquid passages carrying concentrated and dilute solution and condensate from said condenser, and vapor passages connecting said liquid passages in said heat exchanger, said heat exchanger passages permitting the passage of vapor from the condensate line and from the concentrated solution line to the dilute solution line, the system being so constructed that the temperature, pressure, and concentration relations in the heat exchanger insure the concentrated solution to be at a temperature above its boiling point and the dilute solution below its boiling point sufficient to cause vapor to pass from the concentrated solution to the dilute solution, and the temperature and pressure relations of the condensate line with respect to the dilute solution line being such as to cause vapor to pass from the condensate to the dilute solution.

5. In a system for heat conversion by solution cycles, a concentrator containing a solution having a volatile solvent, a heating coil, therefor, a line carrying solvent vapor from said concentrator, a line carrying concentrated solution from said concentrator, a line carrying a fluid component from said heating coil and a line carrying dilute solution to said concentrator, and a heat exchanger having heat exchange passages connected in series with each of said respective lines, said heat exchanger passages permitting the passage of vapor from the line carrying said fluid component from said heating coil, from the line carrying said solvent vapor from the concentrator, and from the concentrated solution line to the dilute solution line, the system being so constructed that the temperature, pressure, and concentration relations in the heat exchanger insure the concentrated solution to be at a temperature above its boiling point and the dilute solution below its boiling point sufficient to cause vapor to pass from the concentrated solution to the dilute solution, and the temperature and pressure relations of the line carrying said fluid component from said heating coil with respect to the dilute solution line being such as to cause vapor to pass from the said fluid component from said heating coil to the dilute solution, and the pressure relation of the line carrying said solvent vapor from the concentrator with respect to the dilute solution line being such as to cause vapor to pass from the said solvent vapor line to the dilute solution.

6. In a system for heat conversion by solution cycles, a concentrator containing a solution having a volatile solvent, a line carrying dilute solution to said concentrator, a line carrying concentrated solution from said concentrator, and a line carrying liquid solvent and a heat exchanger having vapor passages between each of said respective lines, for the absorption in the dilute line of vapors generated in said concentrated solution and liquid solvent lines, the temperature of said dilute solution being sufficiently low and the temperatures of said concentrated solution and liquid solvent being sufficiently high, at the points where the respective lines carrying said solutions and solvent connect with the vapor passages of said heat exchanger, for vapor to pass from said concentrated solution and liquid solvent to said dilute solution.

7. In a cyclic process utilizing at least two solutions having a common solvent, the steps including vaporizing solvent from the second of said solutions, absorbing said vaporized solvent into the first of said solutions at a temperature higher than the temperature of vaporization from said second solution and utilizing the heat accompanying said vapor absorption for the vaporization from pure liquid of the solvent from a third solution within the process, and subsequently condensing the resultant vapor and rejecting its heat of condensation from the cycle at a higher temperature.

8. A counter-flow heat exchange system comprising a first passage, a first solution flowing therein having a volatile solvent, a second passage, a second solution flowing therein capable of absorbing said solvent, and a plurality of vapor passages connecting said first and second passages whereby vapor may be transferred from said first to said second solution, said vapor passages connecting said solution passages at a plurality of points in counter-flow relation.

9. In a cyclic process, the steps including vaporizing a volatile component from a solution containing said volatile component and at least one other component, condensing the vapor into its own liquid, utilizing the accompanying heat effect to vaporize a volatile component from a solution containing said volatile component and at least one other component, absorbing said vapor into a solution in the same fluid cycle and rejecting the accompanying heat effect from the last mentioned solution at a lower temperature the cycle, vaporizing a volatile component from the last mentioned solution at a lower temperature and absorbing said vapor into a solution in the same fluid cycle.

WILLIAM H. SELLEW.